United States Patent
Law et al.

(10) Patent No.: US 12,447,406 B2
(45) Date of Patent: Oct. 21, 2025

(54) CLASSIFYING REAL-WORLD POINTS OF INTEREST IN A PARALLEL VIRTUAL WORLD

(71) Applicant: Niantic Spatial, Inc., San Francisco, CA (US)

(72) Inventors: Herbert Law, San Jose, CA (US); Yuanjian Carla Li, San Francisco, CA (US); Yuan Zhang, San Francisco, CA (US); Hang Tan, San Francisco, CA (US)

(73) Assignee: Niantic Spatial, Inc., San Francisco, CA (US)

( * ) Notice: Subject to any disclaimer, the term of this patent is extended or adjusted under 35 U.S.C. 154(b) by 337 days.

(21) Appl. No.: 17/963,177

(22) Filed: Oct. 10, 2022

(65) Prior Publication Data

US 2024/0115955 A1    Apr. 11, 2024

(51) Int. Cl.
*A63F 13/69* (2014.01)
*A63F 13/216* (2014.01)
*A63F 13/65* (2014.01)

(52) U.S. Cl.
CPC ............ *A63F 13/69* (2014.09); *A63F 13/216* (2014.09); *A63F 13/65* (2014.09); *A63F 2300/8082* (2013.01)

(58) Field of Classification Search
CPC .... A63F 13/216; A63F 13/332; A63F 13/358; A63F 13/47; A63F 13/58; A63F 13/60; A63F 13/65; A63F 13/69; A63F 13/77
See application file for complete search history.

(56) References Cited

U.S. PATENT DOCUMENTS

| | | | |
|---|---|---|---|
| 8,425,289 B2 * | 4/2013 | Beggs | A63F 13/53 463/43 |
| 9,352,216 B2 * | 5/2016 | Mullen | A63F 13/216 |
| 9,858,832 B1 * | 1/2018 | Hsu-Hoffman | A63F 13/803 |
| 10,398,986 B1 * | 9/2019 | Henroid | A63F 13/795 |
| 10,549,198 B1 * | 2/2020 | Zhang | A63F 13/25 |
| 10,625,676 B1 * | 4/2020 | Tsimhoni | G05D 1/0088 |
| 10,720,079 B1 * | 7/2020 | Hsu-Hoffman | A63F 13/90 |
| 10,984,657 B2 * | 4/2021 | Galang | G07C 5/0841 |
| 11,023,515 B2 * | 6/2021 | Dazé | H04L 67/75 |
| 11,273,844 B2 * | 3/2022 | Kassner | G09B 19/167 |
| 11,325,043 B2 * | 5/2022 | Pollock | A63F 13/655 |
| 11,504,622 B1 * | 11/2022 | Sanchez | A63F 13/216 |
| 11,571,622 B2 * | 2/2023 | Mehdi | A63F 13/28 |
| 11,697,069 B1 * | 7/2023 | Sanchez | A63F 13/65 463/31 |

(Continued)

*Primary Examiner* — William H McCulloch, Jr.
(74) *Attorney, Agent, or Firm* — Fenwick & West LLP

(57) ABSTRACT

A machine learning model classifies points of interest in a parallel reality game hosted by a server. The server generates training data sets that include verified properties for points of interest. The machine learning model may predict unverified properties for points of interest. Players in the parallel reality game may input properties for the points of interest. The machine learning model use the received properties from players as inputs to the machine learning model to verify unverified properties or generate new properties for the points of interest. The server may classify the points of interest as suitable for particular activities, and the server may use the classifications for future activities within the parallel reality game.

20 Claims, 7 Drawing Sheets

(56) References Cited

U.S. PATENT DOCUMENTS

| | | | |
|---|---|---|---|
| 11,707,683 B2* | 7/2023 | Russo | A63F 13/216 |
| | | | 463/42 |
| 11,896,903 B2* | 2/2024 | Sanchez | A63F 13/58 |
| 11,918,913 B2* | 3/2024 | Sanchez | A63F 13/216 |
| 11,969,653 B2* | 4/2024 | Sanchez | A63F 13/65 |
| 11,969,655 B2* | 4/2024 | Pollock | A63F 13/655 |
| 12,001,764 B2* | 6/2024 | Dahl | A63F 13/56 |
| 12,246,259 B2* | 3/2025 | Sanchez | A63F 13/65 |
| 2008/0055311 A1* | 3/2008 | Aleksic | G06T 15/00 |
| | | | 345/428 |
| 2010/0287011 A1* | 11/2010 | Muchkaev | A63F 13/792 |
| | | | 706/45 |
| 2012/0053805 A1* | 3/2012 | Dantu | B60W 40/09 |
| | | | 701/70 |
| 2012/0215375 A1* | 8/2012 | Chang | B60W 50/14 |
| | | | 701/1 |
| 2012/0221216 A1* | 8/2012 | Chauncey | B60W 40/09 |
| | | | 701/1 |
| 2013/0316311 A1* | 11/2013 | England | G09B 19/167 |
| | | | 434/65 |
| 2016/0098339 A1* | 4/2016 | Masilamani | G06F 1/3212 |
| | | | 702/186 |
| 2016/0300389 A1* | 10/2016 | Glenn, III | G01C 21/1656 |
| 2018/0053433 A1* | 2/2018 | Dunn | G09B 7/00 |
| 2018/0311573 A1* | 11/2018 | Pickover | G16H 15/00 |
| 2018/0357233 A1* | 12/2018 | Dazé | H04L 67/561 |
| 2019/0213794 A1* | 7/2019 | Carr | G06T 11/206 |
| 2020/0160055 A1* | 5/2020 | Nakamura | G09B 29/10 |
| 2020/0184500 A1* | 6/2020 | Yuyama | B60W 40/09 |
| 2021/0129018 A1* | 5/2021 | Liu | A63F 13/30 |
| 2021/0270621 A1* | 9/2021 | Mayster | H04W 4/024 |
| 2021/0286838 A1* | 9/2021 | Dazé | H04L 67/12 |
| 2021/0354040 A1* | 11/2021 | Pollock | A63F 13/213 |
| 2021/0377696 A1* | 12/2021 | Hagland | H04L 67/52 |
| 2022/0047951 A1* | 2/2022 | Mehdi | A63F 13/803 |
| 2022/0143498 A1* | 5/2022 | Åkerfeldt | A63F 13/352 |
| 2022/0185197 A1* | 6/2022 | Shimizu | B60R 11/02 |
| 2022/0288495 A1* | 9/2022 | Endo | A63F 13/798 |
| 2022/0289197 A1* | 9/2022 | Endo | A63F 13/58 |
| 2022/0292886 A1* | 9/2022 | Endo | B60K 35/22 |
| 2023/0277939 A1* | 9/2023 | Walker | A63F 13/58 |
| | | | 463/31 |
| 2023/0285862 A1* | 9/2023 | Walker | A63F 13/49 |
| 2024/0115955 A1* | 4/2024 | Law | A63F 13/65 |

* cited by examiner

CLASSIFYING REAL-WORLD POINTS OF INTEREST IN A PARALLEL VIRTUAL WORLD

FIELD OF THE INVENTION

The present disclosure relates generally to location-based applications, and more particularly, to classifying real-world locations as part of a parallel reality game.

BACKGROUND

A parallel reality game includes a shared virtual world that parallels at least a portion of the real world. The shared virtual world can host a variety of interactions that can attract a community of players. Providing a virtual world with a geography that parallels at least a portion of the real world allows players to navigate the virtual world by navigating the real world. Linking virtual elements in the virtual environment with real world objects, locations, and actions in the real world can encourage players to travel to and notice features in the real world that the players would normally ignore. Providing virtual elements in the same location in the virtual world as their counterpart real world objects or locations in the real world increases the feeling that the virtual elements are hidden parts of the real world.

A parallel reality game can include game features that encourage players to interact in the virtual world, such as through social interactions with other players in the virtual world and through various game objectives in the virtual world. Certain game features can be provided to more closely link the parallel virtual world with the real world. A parallel reality game can also include game features that encourage players to interact simultaneously in the real world and the virtual world, for example by coming together in a defined geographic area in the real world at a particular time and date, and while together in the real world interacting with each other as well in the virtual world.

It is valuable for a parallel reality game to contain properties describing the qualities of real-world points of interest. For example, it may be helpful for a parallel reality game to determine whether a location is a building, street, or open field, as well as properties that describe the suitability of the waypoint for different objectives or placement of virtual items at the waypoint. However, such rich data is often not available for many waypoints.

SUMMARY

A machine learning model classifies points of interest in a parallel reality game hosted by a server. The server generates training data sets that include verified properties for points of interest. The machine learning model may predict unverified properties for points of interest. Players in the parallel reality game may input properties for the points of interest. The machine learning model use the received properties from players as inputs to the machine learning model to verify unverified properties or generate new properties for the points of interest. The server may classify the points of interest as suitable for particular activities, and the server may use the classifications for future activities within the parallel reality game.

In some embodiments, a method includes generating training data sets for classifying points of interest. A machine-learning point of interest classification model may be trained using the training data sets. An identification of a point of interest may be received from a client device. Properties may be retrieved for the point of interest. A properties input interface may be generated to be displayed on the client device. a selection of properties may be received from the client device. The properties may be updated for the point of interest based on the selection of properties.

Other exemplary implementations of the present disclosure are directed to systems, apparatus, non-transitory computer-readable media, devices, and user interfaces for classifying points of interest in a location-based parallel reality game.

Aspects and advantages of various embodiments are described in the following description. Additional aspects and advantages may be apparent to one of skill in the art based on the description or may become apparent through practice of the embodiments. The accompanying drawings, which are incorporated in and constitute a part of this specification, illustrate various embodiments and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Overview

Figure 1:
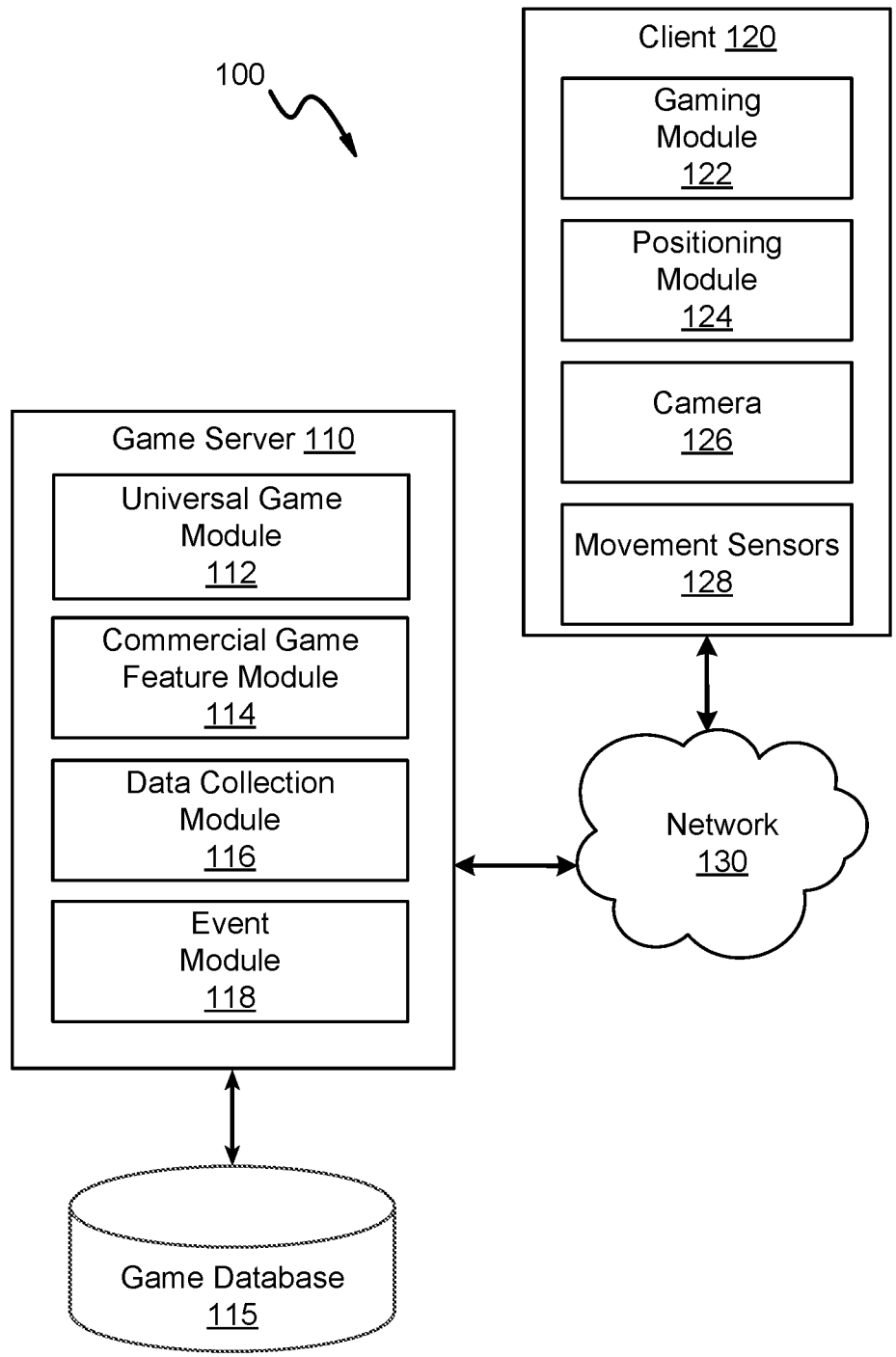
FIG. 1 is a block diagram of a networked computing environment in which players may input waypoint properties within a parallel reality game, according to one embodiment.

A game server can host a location-based application that includes a virtual world with a geography that parallels at least a portion of the real-world geography. Various embodiments are described in which the location-based application is a parallel reality game in which players can navigate a range of coordinates defining a virtual space in the virtual world by navigating a range of geographic coordinates in the real world. In particular, the positions of players can be monitored or tracked using, for instance, a positioning system (e.g., a GPS system) associated with a player's client device which may be a mobile computing device. Player position information can be provided to the game server hosting the parallel reality game over a network and can be used by the game to update player locations in the virtual world. As a result, as the player continuously moves about in a range of coordinates in the real world with their client device, the game server may update such that the player also continuously moves about in a range of coordinates in the parallel virtual world. In other embodiments, the same or similar functionality is provided in other location-based applications.

The virtual world can include one or more virtual elements that are linked with real-world points of interest. For instance, the virtual world can include various virtual elements associated with points of interest such as landmarks, museums, works of art, libraries, or other areas of interest in the real world. The virtual elements linked with real-world point of interest can provide the illusion that the virtual world is a hidden dimension of the real world that a player can interact with by playing the parallel reality game. As players navigate geographic coordinates in the real world, the players can discover and interact with virtual elements provided in the parallel virtual world. Various game objectives can encourage players to interact with these virtual elements as part of the parallel reality game. In some embodiments, the game server may orchestrate virtual events in the parallel reality game around real-world points of interest.

To improve the link between the real world and the parallel virtual world, certain game features can be linked with real-world activity, such as real-world commercial activity or real-world data collection activity, to enhance the impact that actions in the virtual world would have based on actions in the real world and vice versa, thereby, improving the user experience in the parallel reality game. Game features linked with commercial activity in the real world can be included in the parallel reality game such that player actions while playing the parallel reality game can encourage or incentivize commercial activity in the real world. Sponsors, advertisers, businesses, and other entities can request certain game features to be included in the parallel reality game to increase the exposure of their business or other entities to players of the parallel reality game.

The game server hosting the parallel reality game can modify, update, or add to game data stored in a game database associated with the parallel reality game to include certain game features in the parallel reality game. Access-controlled game features can be included that are available only to players who meet certain criteria (e.g., ticket holders for a special event at specified location and time, players who have participated in a particular promotional offer, players who completed specified in-game tasks, or any other definable group). For instance, the game features can be linked to things in the real world (e.g., real-world live events, real-world points of interest) such that player actions associated with the game features in the virtual world can lead to or encourage commercial activity.

The game server may collect properties describing points of interest in the rear world. The game server may determine, based on the properties, whether points of interest are suitable for specific activities or people. The game server may collect the properties from internal or external data sources. Additionally, the game server may prompt users playing the parallel reality game to enter properties describing points of interest. The game server may train and execute a machine-learning model to classify the points of interest based on the collected properties. The classifications may be used by the game server to select points of interest for various applications within the parallel reality game, such as placement of virtual items, gathering locations, placement of advertisements, route planning, or any other suitable application.

Exemplary Location-Based Parallel Reality Gaming System

A parallel reality game is a location-based game having a virtual world geography that parallels at least a portion of the real-world geography such that player movement and actions in the real world affect actions in the virtual world and vice versa. Those of ordinary skill in the art, using the disclosures provided herein, will understand that the subject matter described is applicable in other situations where verifying the location of a user is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

FIG. 1 illustrates one embodiment of a networked computing environment 100 in which real-world locations may be classified as part of a parallel reality game. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 120 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 120.

Figure 2:
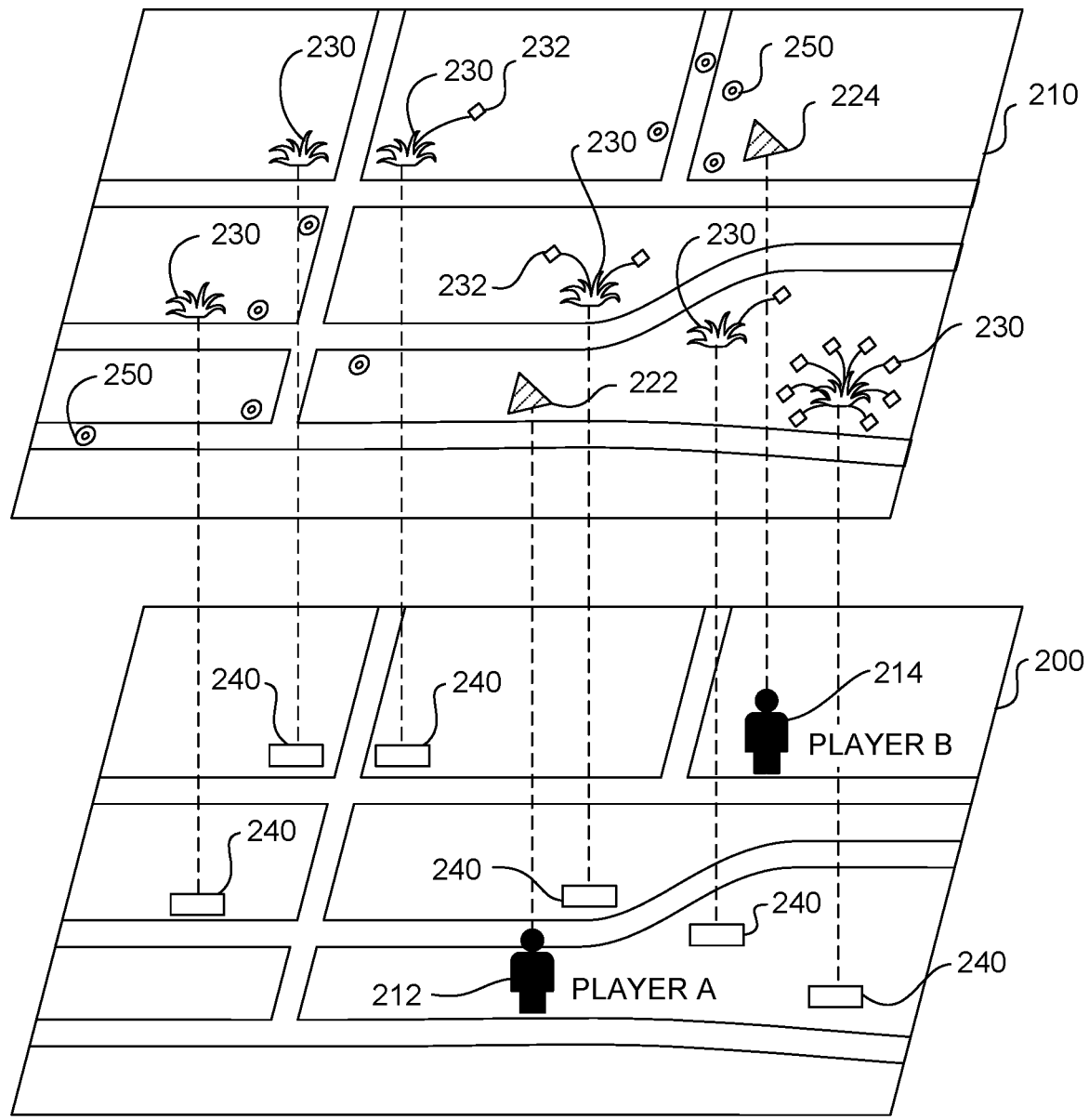
FIG. 2 depicts a representation of a virtual world having a geography that parallels the real world, according to one embodiment.

Reference is now made to FIG. 2 which depicts a conceptual diagram of a virtual world 210 that parallels the real world 200 that can act as the game board for players of a parallel reality game, according to one embodiment. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to or interact with various virtual elements or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements or objects at the specific location to achieve or perform one or more game objectives.

For example, a game objective can require players to capture or claim ownership of virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 in order to interact with or capture a virtual element 230 linked with that particular landmark 240. The interaction with the virtual element 230 can require action in the real world, such as taking a photograph or verifying, obtaining, or capturing other information about the landmark or object 240 associated with the virtual element 230. In some embodiments, the interaction with the virtual element 230 may further prompt verification of the player's location in the real world 200 matching the player's location in the virtual world 210.

Game objectives may require that players use one or more virtual items that are collected by the players in the location-based game. For instance, the players may travel the virtual world 210 seeking virtual items (e.g., weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real-world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward that can be used throughout the game (e.g., to purchase in-game items). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 110 communicates with one or more clients 120 over a network 130 to provide a parallel reality game to players at the clients 120. The networked computing environment 100 also may include other external systems such as sponsor/advertiser systems or business systems. Although only one client 120 is illustrated in FIG. 1, any number of clients 120 or other external systems may be connected to the game server 110 over the network 130. Furthermore, the networked computing environment 100 may contain different or additional elements and functionality may be distributed between the clients 120 and the server 110 in a different manner than described below.

The game server 110 can be any computing device and can include one or more processors and one or more computer-readable media. The computer-readable media can store instructions which cause the processor to perform operations. The game server 110 can include or can be in communication with a game database 115. The game database 115 stores game data used in the parallel reality game to be served or provided to the client(s) 120 over the network 130.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual world elements (e.g. location of real world-objects/landmarks, description of real world objects/landmarks, relevance of virtual elements linked to real world objects, properties of points of interest, classifications of points of interest, etc.); (6) game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators or by data received from users/players of the system 100, such as from one or more clients 120 over the network 130.

The game database 115 may include training datasets for a machine-learning model configured to classify points of interests. The training datasets may include labeled data indicating whether a point of interest includes one or more properties. The training datasets may be generated by the data collection module 116 and include data obtained from internal or external databases, as well as from one or more clients 120.

The game server 110 can be configured to receive requests for game data from one or more clients 120 (for instance via remote procedure calls (RPCs)) and to respond to those requests via the network 130. For instance, the game server 110 can encode game data in one or more data files and provide the data files to the client 120. In addition, the game server 110 can be configured to receive game data (e.g., player positions, player actions, player input, etc.) from one or more clients 120 via the network 130. For instance, the client 120 can be configured to periodically send player input and other updates to the game server 110, which the game server 110 uses to update game data in the game database 115 to reflect any and all changed conditions for the game.

In the embodiment shown, the game server 110 includes a universal gaming module 112, a commercial game feature module 114, a data collection module 116, and an event module 118. The game server 110 interacts with a game database 115 that may be part of the game server 110 or accessed remotely (e.g., the game database 115 may be a distributed database accessed via the network 130). In other embodiments, the game server 110 contains different or additional elements. In addition, the functions may be distributed among the elements in a different manner than described. For instance, the game database 115 can be integrated into the game server 110. In some embodiments, the game server 110 interacts with third party databases that include properties describing real-world locations.

The universal game module 112 hosts the parallel reality game for all players and acts as the authoritative source for the current status of the parallel reality game for all players. The universal game module 112 receives game data from clients 120 (e.g., player input, player position, player actions, landmark information, etc.) and incorporates the game data received into the overall parallel reality game for all players of the parallel reality game. The universal game module 112 can also manage the delivery of game data to the clients 120 over the network 130. The universal game module 112 may also govern security aspects of clients 120 including but not limited to securing connections between the clients 120 and the game server 110, establishing connections between various clients 120, and verifying the location of the various clients 120.

The commercial game feature module 114, in embodiments where one is included, can be separate from or a part of the universal game module 112. The commercial game feature module 114 can manage the inclusion of various game features within the parallel reality game that are linked with a commercial activity in the real world. For instance, the commercial game feature module 114 can receive requests from external systems such as sponsors/advertisers, businesses, or other entities over the network 130 (via a network interface) to include game features linked with commercial activity in the parallel reality game. The commercial game feature module 114 can then arrange for the inclusion of these game features in the parallel reality game.

The game server 110 can further include a data collection module 116. The data collection module 116, in embodiments where one is included, can be separate from or a part of the universal game module 112. The data collection module 116 can manage the inclusion of various game features within the parallel reality game that are linked with a data collection activity in the real world. For instance, the data collection module 116 can modify game data stored in the game database 115 to include game features linked with data collection activity in the parallel reality game. The data collection module 116 can also analyze and data collected by players pursuant to the data collection activity and provide the data for access by various platforms. The data collection module 116 may be configured to collect properties describing points of interest from the client 120 and the game database 115. The data collection module 116 may further include a machine-learning module configured to classify points of interest based on the collected properties. Various embodiments of the data collection module 116 are described in greater detail below, with reference to FIGS. 5-6.

The event module 118 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

A client 120 can be any portable computing device that can be used by a player to interface with the gaming system 100. For instance, a client 120 can be a wireless device, a personal digital assistant (PDA), portable gaming device, cellular phone, smart phone, tablet, navigation system, handheld GPS system, wearable computing device, a display having one or more processors, or other such device. In short, a client 120 can be any computer device or system that can enable a player to interact with the game system 100.

The client 120 can include one or more processors and one or more computer-readable media. The computer-readable media can store instructions which cause the processor to perform operations. The client 120 can include various input/output devices for providing and receiving information from a player, such as a display screen, touch screen, touch pad, data entry keys, speakers, cameras, or a microphone suitable for voice recognition. The client 120 may also include other various sensors for recording data from the client 120 including but not limited to movement sensors, accelerometers, gyroscopes, other inertial measurement units (IMUs), barometers, positioning systems, thermometers, light sensors, etc. The client 120 can further include a network interface for providing communications over the network 130. A network interface can include any suitable components for interfacing with one more networks, including for example, transmitters, receivers, ports, controllers, antennas, or other suitable components.

Because the networked computing environment 100 provides a location-based game, the client 120 is preferably a portable computing device that can be easily carried or otherwise transported with a player, such as a smartphone or tablet. In the embodiment shown in FIG. 1, each client 120 includes software components such as a gaming module 122 and a positioning module 124 with various physical components such as a camera 126 and a plurality of movement sensors 128. In other embodiments, the clients 120 may include different or additional elements such as a display (as a component of the client 120 or external to the client 120) or various input devices (e.g., a touchscreen, a mouse, a stylus, etc.).

The gaming module 122 provides a player with an interface to participate in the parallel reality game. The game server 110 transmits game data over the network 130 to the client 120 for use by the gaming module 122 at the client 120 to provide local versions of the game to players at locations remote from the game server 110. The server 110 can include a network interface for providing communications over the network 130. A network interface can include any suitable components for interfacing with one more networks, including for example, transmitters, receivers, ports, controllers, antennas, or other suitable components.

The gaming module 122 executed by the client 120 provides an interface between a player and the parallel reality game. The gaming module 122 can present a user interface on a display device associated with the client 120 that displays a virtual world (e.g., renders imagery of the virtual world) associated with the game and allows a user to interact in the virtual world to perform various game objectives. The gaming module 122 can also control various other outputs to allow a player to interact with the game without requiring the player to view a display screen. For instance, the gaming module 122 can control various audio, vibratory, or other notifications that allow the player to play the game without looking at the display screen. The gaming module 122 can access game data received from the game server 110 to provide an accurate representation of the game to the user. The gaming module 122 can receive and process player input and provide updates to the game server 110 over the network 130.

The gaming module 122 may present an interface for the player to enter properties describing a point of interest. In some embodiments, the properties include objective properties, such as "building" or "open space." Additionally or alternatively, the properties may include subjective properties, such as "loud," "quiet," "pretty," "interesting," or any other suitable property describing the point of interest. The gaming module 122 may present the interface in response to the user being located at or near the point of interest. The gaming module 122 may provide the properties to the data collection module 115. In some embodiments, the gaming module 122 may provide an incentive for the player to select properties describing a point of interest. For example, the gaming module 122 may provide bonus points or prevent the player from proceeding to a subsequent screen until the player selects properties for the point of interest.

The positioning module 124 can be any device or circuitry for monitoring the position of the client 120. For example, the positioning module 124 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 124 may further include various other sensors that may aid in accurately positioning the client 120 location.

As the player moves around with the client 120 in the real world, the positioning module 124 tracks the position of the player and provides the player position information to the gaming module 122. The gaming module 122 updates the player position in the virtual world associated with the game based on the actual position of the player in the real world. Thus, a player can interact with the virtual world simply by carrying or transporting the client 120 in the real world. In particular, the location of the player in the virtual world can correspond to the location of the player in the real world. The gaming module 122 can provide player position information to the game server 110 over the network 130 such that the universal gaming module 112 keeps track of all player positions throughout the game. In response, the game server 110 may enact various techniques to verify the client 120 location to prevent cheaters from spoofing the client 120 location. It should be understood that location information associated with a player is utilized only if permission is granted after the player has been notified that location information of the player is to be accessed and how the location information is to be utilized in the context of the game (e.g., to update player position in the virtual world). In addition, any location information associated with players will be stored and maintained in a manner to protect player privacy.

The network 130 can be any type of communications network, such as a local area network (e.g., intranet), wide area network (e.g., Internet), or some combination thereof. The network can also include a direct connection between a client 120 and the game server 110. In general, communication between the game server 110 and a client 120 can be carried via a network interface using any type of wired or wireless connection, using a variety of communication protocols (e.g., TCP/IP, HTTP, SMTP, FTP), encodings or formats (e.g., HTML, XML, JSON), or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
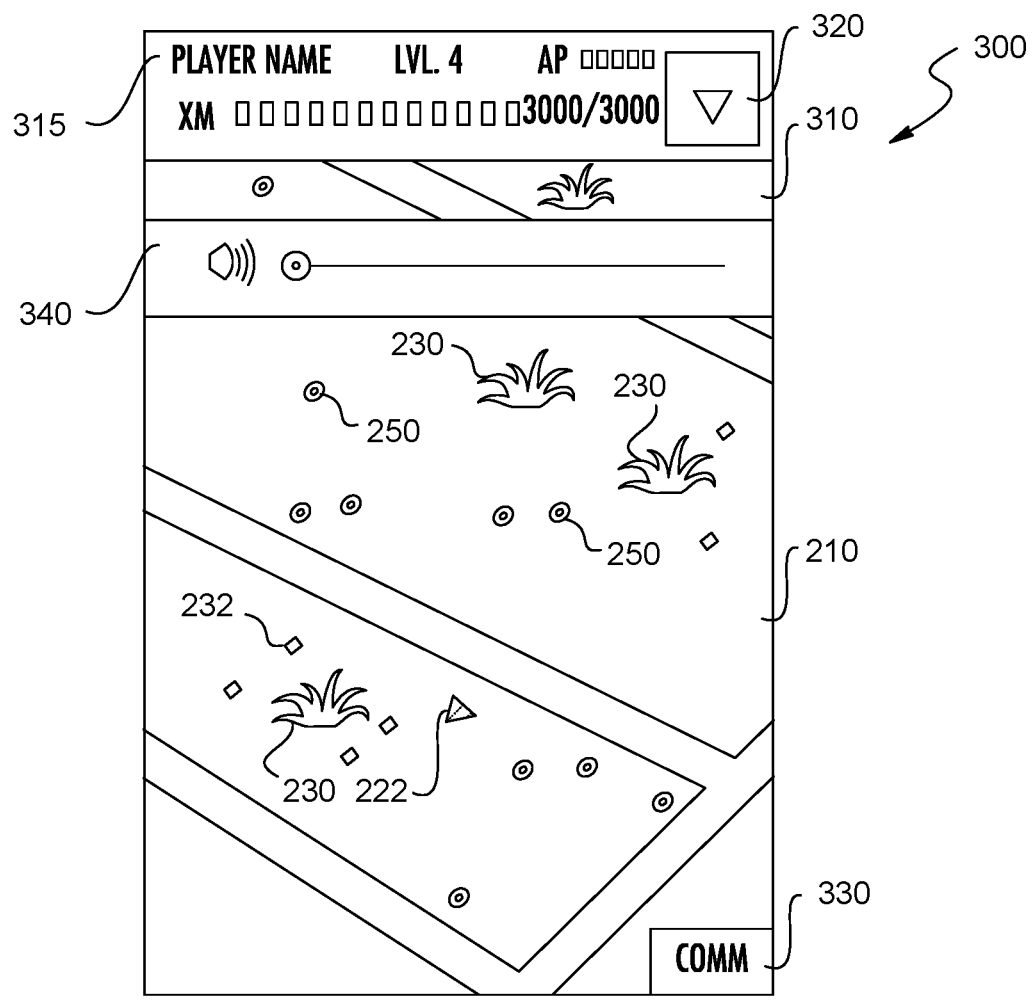
FIG. 3 depicts an exemplary game interface of a parallel reality game, according to one embodiment.

FIG. 3 depicts one embodiment of a game interface 300 that can be presented on a display of a client 120 as part of the interface between a player and the virtual world 210. The game interface 300 includes a display window 310 that can be used to display the virtual world 210 and various other aspects of the game, such as player position 222 and the locations of virtual elements 230, virtual items 232, and virtual energy 250 in the virtual world 210. The user interface 300 can also display other information, such as game data information, game communications, player information, client location verification instructions and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the parallel reality game.

According to aspects of the present disclosure, a player can interact with the parallel reality game by simply carrying a client device 120 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, the user interface 300 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Operation of Parallel Reality Game Client-Server Flow Diagram

Figure 4:
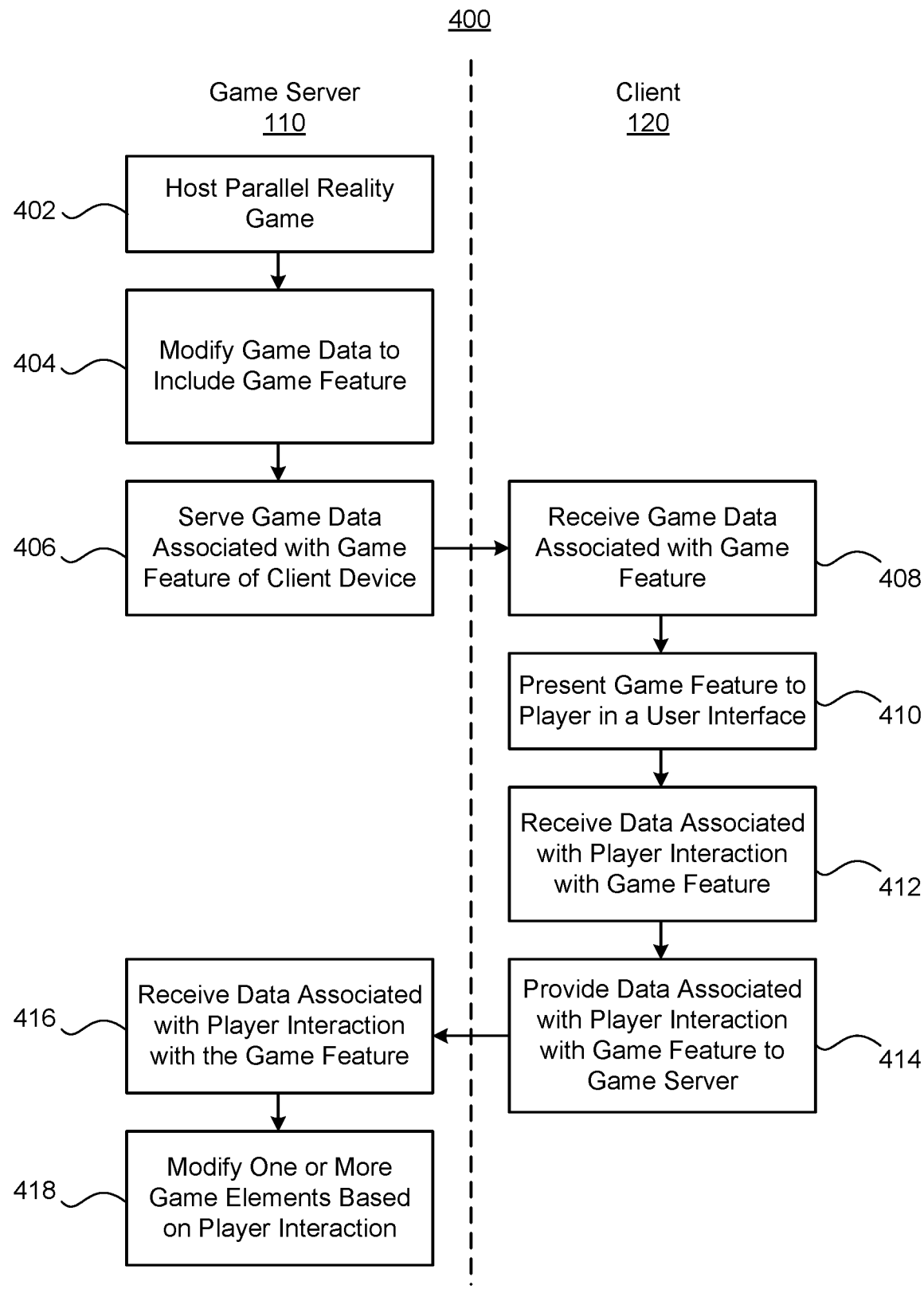
FIG. 4 is a server-client interaction diagram of a method for linking real-world activity with a parallel reality game, according to one embodiment.

FIG. 4 depicts a client-server flow diagram of a method 400 for classifying real-world points of interest with a parallel reality game, according to one embodiment. The method 400 can be implemented using any suitable computing system, such as the client-server arrangement of the system 100 of FIG. 1. In addition, although FIG. 4 depicts steps performed in a particular order for purposes of illustration and discussion, the methods described are not limited to any particular order or arrangement. One skilled in the art will appreciate that various steps of the methods disclosed herein can be omitted, rearranged, combined, or adapted in various ways without deviating from the scope of the present disclosure. The methods may also include different or additional steps.

In the embodiment shown in FIG. 4, the method 400 begins with a game server 110 hosting 402 the parallel reality game for a plurality of client devices 120. Players can access the parallel reality game by communicating with the game server 110 over the network 130 via one or more client devices 120. In this manner, the game server 110 may act as an authoritative source of events for the parallel reality game.

The server can modify 404 game data associated with the parallel reality game to include a game feature. For instance, the game server 110 can modify, update, or add game data to the game database 115 such that a game feature is included in the parallel reality game. Some game features may be linked with a real-world activity. These game features can be any game feature designed to incentivize or encourage activity by players in the real world, including activities in the real world not directly related to the overall game objective for the parallel reality game. In particular embodiments, the game feature linked with a real-world activity can be a game feature linked with a commercial activity in the real world.

The game server 110 serves 406 the parallel reality game, including the game features, to one or more client devices 120 over the network 130. A client device 120 receives 408 the game data from the game server 110 including data associated with the game feature. The client device 120 then presents 410 the parallel reality game, including the game features to a player. For instance, a client device 120 can display a visual representation of the virtual world. The virtual world can include the game feature, such as a virtual element located at a specific location in the virtual world to encourage or incentivize player activity in the real world.

The client device 120 receives 412 data associated with player interaction with the game feature. For instance, a client device 120 can receive data as a result of a player action directed toward the game feature in the parallel reality game. The data associated with a player interaction can include data associated with a player navigating to a location of a particular virtual element and interacting with the virtual element. As another example, the data associated with a player interaction can include data associated with a player taking actions to complete a game objective or task. As another example, the data associated with a player interaction can include data associated with a player using a power up or other enhanced power provided to a player as part of the game feature linked with the real-world activity. As another example, the data associated with a player interaction may include data associated with a player describing properties of a point of interest, such as by selecting properties from a list of properties, typing or speaking a description about a point of interest. The client device provides 414 the data associated with player interaction with the game feature to the server.

The data associated with the player interaction with the game feature can be received 416 at the game server 110. For instance, the game server 110 can receive 416 the data associated with player interaction with the game feature from a client device 120 over the network 130. The game server 110 can then modify 418 one or more game elements in the parallel reality game based on the data associated with the player interaction. For instance, the game server 110 can update game data stored in the game database 115 associated with a player (such as a player profile stored in the game database 115) to record the player's interaction with the game feature linked with the real-world activity. In addition, the server can update game data to provide a reward, such as a virtual reward suitable for use in the parallel reality game, for interacting with the game feature. The virtual reward can include a virtual item, virtual energy, virtual currency, virtual power-up, enhanced power, experience points, or any other suitable reward.

Machine-Learning Classification of Points of Interest

Figure 5:
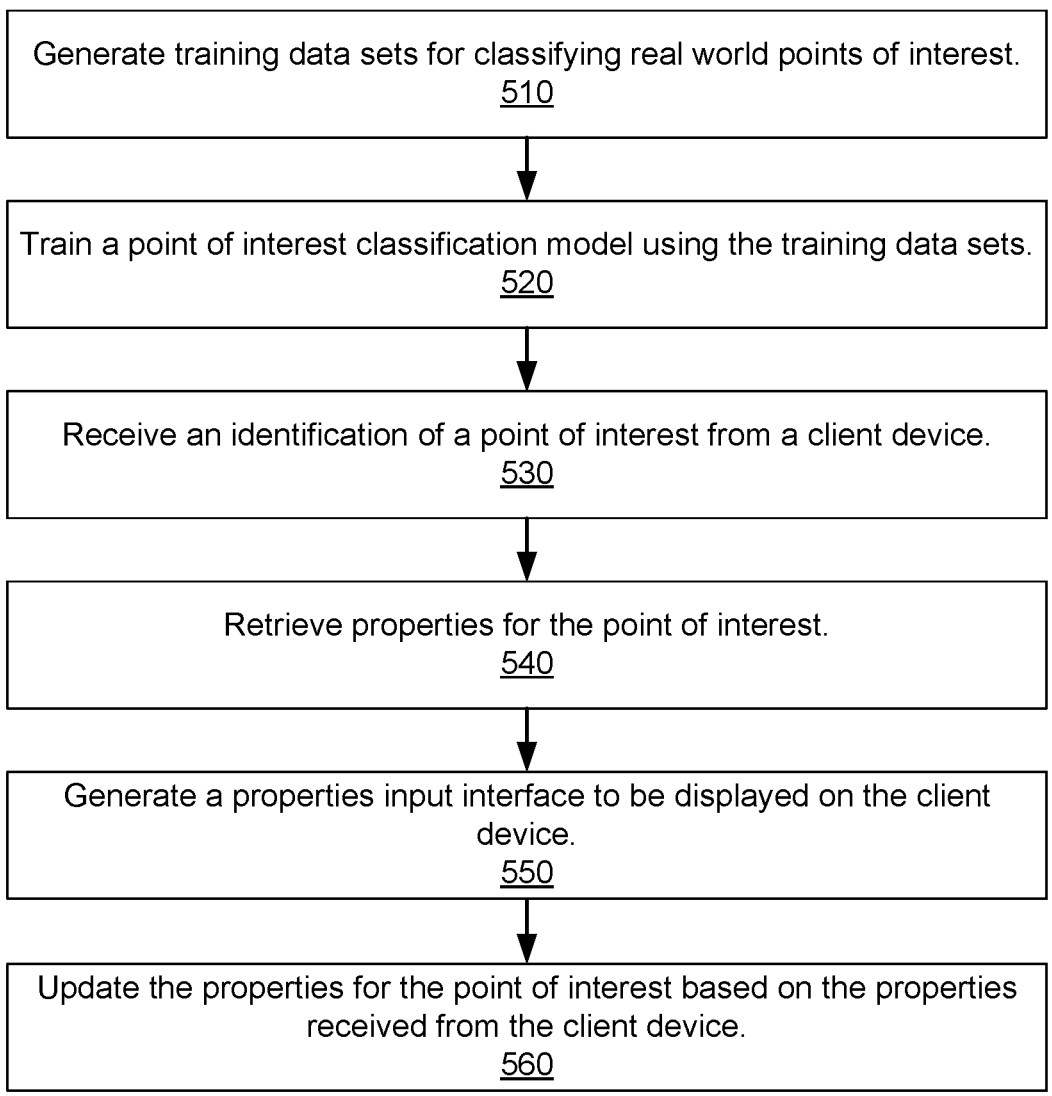
FIG. 5 is an illustration of a process for classifying points of interest using a machine-learning model, according to one embodiment.

FIG. 5 is a flowchart of a process 500 for classifying points of interest using a machine-learning model, in accordance with one embodiment. The process 500 can be implemented using any suitable computing system, such as the client-server arrangement of the system 100 of FIG. 1. In addition, although FIG. 5 depicts steps performed in a particular order or by a particular device for purposes of illustration and discussion, the methods discussed herein are not limited to any particular order or arrangement. One skilled in the art, using the disclosures provided herein, will appreciate that various steps of the methods disclosed herein can be omitted, rearranged, combined, or adapted in various ways without deviating from the scope of the present disclosure. The methods may also include different or additional steps.

The game server generates 510 training data sets for classifying real-world points of interest. The training data sets may include properties describing points of interest such as geographic coordinates, name, point of interest ID, category, activity statistics (e.g., number of interactions, number of visits by players), point of interest type (e.g., park, sculpture, restaurant, etc.), environment (e.g., noise level, size of playable areas, dog-friendly, crowdedness, etc.), activity suitability (e.g., suitable to play, suitable for kids, suitable for augmented reality), emotional quality (e.g., calm, relaxed, peaceful, exciting, etc.), or any other suitable properties. The game server may obtain the properties from an internal or external database. In some embodiments, the properties may be obtained in person by trusted humans, such as employees or contractors of an entity controlling the game server. In some embodiments, the properties may be obtained via informational materials on the internet. For example, the game server may scrape encyclopedic websites for properties describing the points of interest. The gamer server may apply natural language processing to text or audio to extract properties of the point of interest.

The game server may label the properties in the training data sets as being true or false based on the information obtained by the game server. In some embodiments, the game server may label some properties as being potentially true. For example, the game server may label properties obtained by trusted humans as being verified, and properties obtained via a third-party website as being unverified.

The game server trains 520 a point of interest classification model using the training data sets. In some embodiments, the game server uses supervised machine learning to train 520 the classification model, with the properties of the training data sets serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The point of interest classification model, when applied to known properties for a point of interest, outputs predicted properties for unknown properties of the point of interest. In some embodiments, the predicted properties may include a category label for any of the properties. In some embodiments, the predicted properties may include a binary value, such as a Boolean yes/no estimate, or a scalar value representing a probability.

In some embodiments, the game server iteratively retrains the point of interest classification model until the occurrence of a stopping condition, such as the accuracy measurement indication that the model is sufficiently accurate, or a number of training rounds having taken place.

The game server receives 530 an identification of a point of interest from a client device. In some embodiments, the game server may receive geographic coordinates and determine a point of interest based on the geographic coordinates. In some embodiments, the game server may receive a photograph or video stream from the client device and correlate the photograph or video stream to a stored point of interest based on an image comparison or metadata for the photograph. In some embodiments, the game server may receive a written or spoken identification of a point of interest from a client device.

The game server retrieves 540 properties for the received point of interest. In some embodiments, the properties for the point of interest may be stored in the game database. In some embodiments, the point of interest may not be present in the game database, and the game server may generate a new record for the point of interest. In some embodiments, the game server may input the point of interest to the point of interest classification module in response to receiving the point of interest from the client device. The point of interest classification module outputs properties for the point of interest. In some embodiments, the game server may have previously input the point of interest to the point of interest classification module, and the game server may retrieve stored properties for the point of interest. The output properties may include verified properties and unverified properties. The verified properties may include properties which the game server has determined the point of interest has above a threshold confidence level, such as above 90% confidence. The unverified properties may include properties which the game server predicts the point of interest includes which a confidence level below the threshold confidence level.

The game server generates 550 generates a properties input interface to be displayed on the client device. The properties input interface may request that the user of the client device input properties describing the point of interest. The input interface may instruct the user to input properties for the point of interest in any suitable manner. In some embodiments, the input interface may display a list of unverified properties and instruct the user to select the applicable properties. In some embodiments, the input interface may display typed questions asking the user whether the point of interest includes a property. In some embodiments, the input interface may not display any suggested properties, and may instead provide a menu or blank entry field for a user to select or enter properties.

The game server updates 560 the properties for the point of interest based on the properties received from the client device. The game server may not necessarily assume that the received properties are accurate. For example, a user may intentionally or unintentionally input incorrect properties. However, the point of interest classification module may use the input properties as additional inputs to evaluate whether to update the stored properties for the point of interest. In some embodiments, the point of interest classification module may compare the inputs from multiple users for a point of interest to determine whether the users submitted the same properties, which may indicate a high degree of confidence that the properties are accurate. In some embodiments, the point of interest module may weight the properties submitted by a user lower in response to some of the properties submitted by the user being inaccurate or inconsistent with submissions by other users.

The game server may use the updated properties for the point of interest to perform various actions. For example, the game server may select an advertisement to be displayed adjacent to the point of interest based on the properties of the point of interest. In some embodiments, based on the properties of the point of interest, the game server may place virtual items at the point of interest for players to search for.

Figure 6:
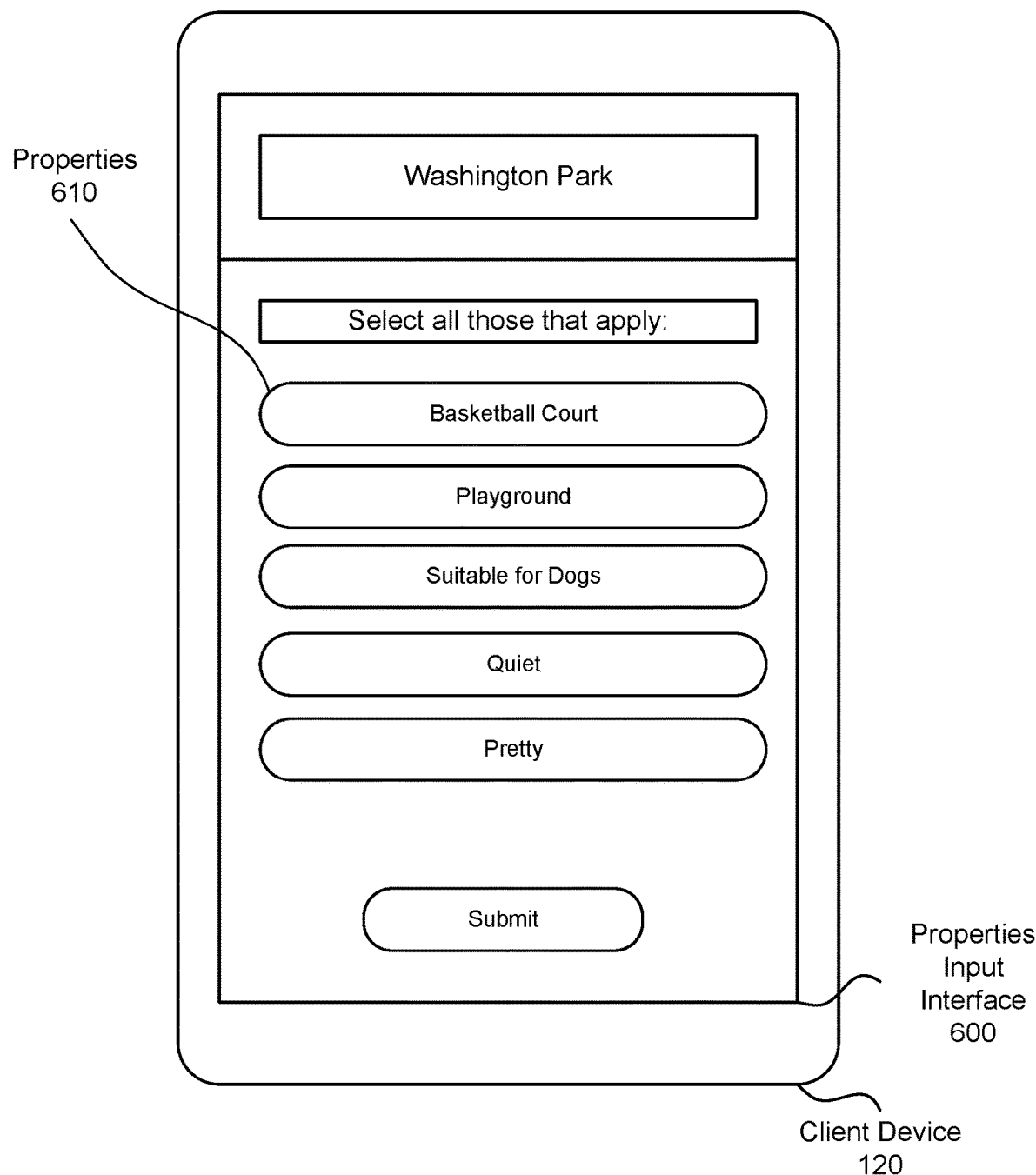
FIG. 6 is an illustration of a properties input interface, according to one embodiment.

Referring to FIG. 6, a client device 120 including a properties input interface 600 is illustrated according to one or more embodiments. The properties input interface 600 may display a point of interest at which the client device is located. The properties input interface 600 may prompt the user to input properties describing the point of interest. As illustrated in FIG. 6, the properties are displayed as selectable buttons 610. In other embodiments, the properties may be input to the properties input interface 600 in any suitable manner, as previously described with respect to FIG. 5. The properties may include objective properties, such as basketball court or playground, as well as subjective properties, such as quiet or pretty. Once the user has input the properties corresponding to the point of interest, the client device 120 may display a subsequent screen for the user to continue a game or display an indication of an award given to the user for submitting the properties.

The systems and method disclosed herein advantageously combine data describing points of interest from verified data sources as well as from unverified submissions by individuals using a machine learning model such that additional properties may be determined to be verified properties for points of interest. The points of interest may be classified and suggested for various applications within a parallel game based on the properties of the points of interest.

Example Computing System

Figure 7:
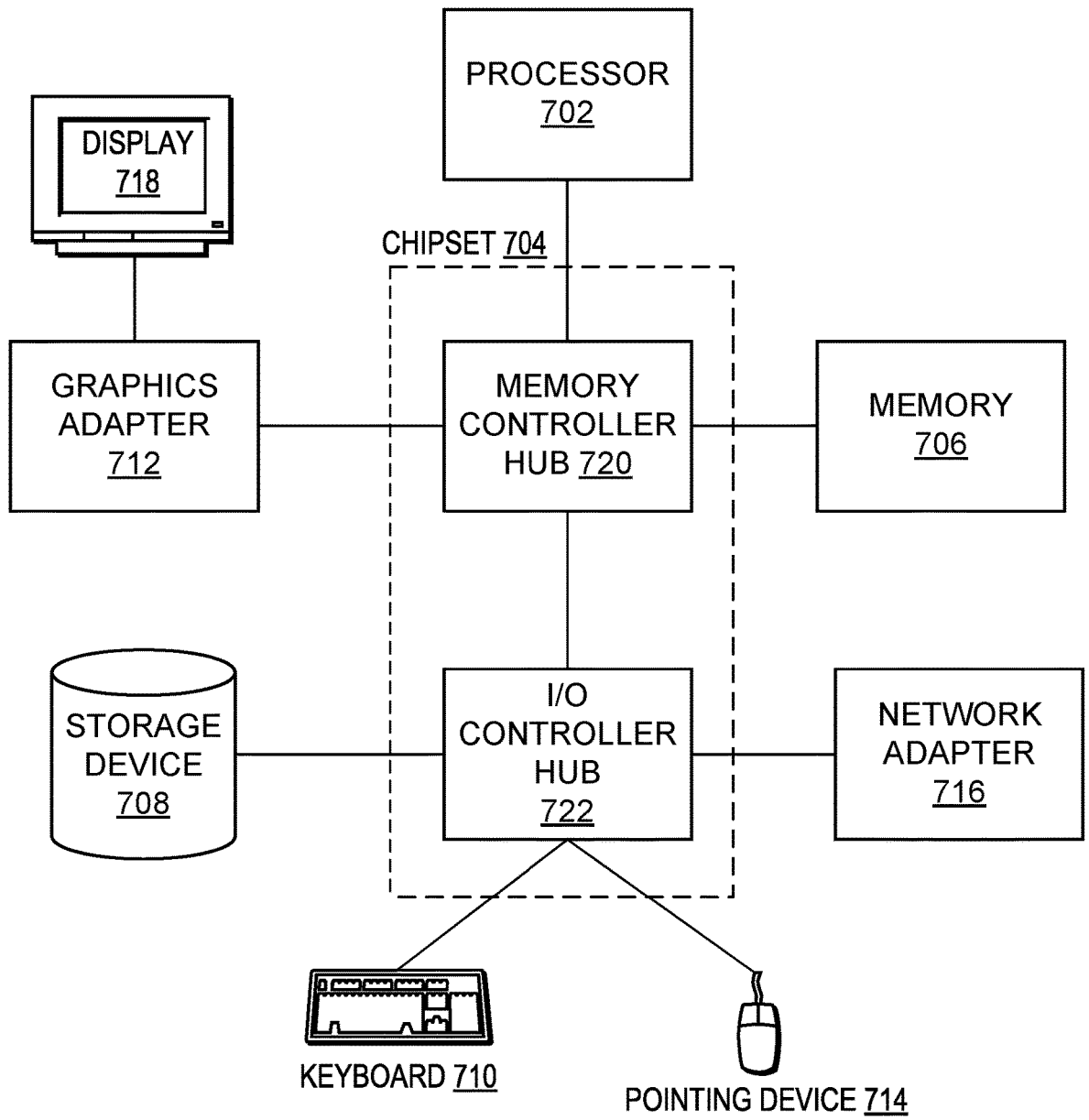
FIG. 7 is an example architecture of a computing device, according to one embodiment.

FIG. 7 is an example architecture of a computing device, according to an embodiment. Although FIG. 7 depicts a high-level block diagram illustrating physical components of a computer used as part or all of one or more entities described herein, in accordance with an embodiment, a computer may have additional, less, or variations of the components provided in FIG. 7. Although FIG. 7 depicts a computer 700, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 7 are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O hub 722. In another embodiment, the memory 706 is coupled directly to the processor 702 instead of the chipset 704. In some embodiments, the computer 700 includes one or more communication buses for interconnecting these components. The one or more communication buses optionally include circuitry (sometimes called a chipset) that interconnects and controls communications between system components.

The storage device 708 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 708 can also be referred to as persistent memory. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

The memory 706 holds instructions and data used by the processor 702. The memory 706 can be non-persistent memory, examples of which include high-speed random access memory, such as DRAM, SRAM, DDR RAM, ROM, EEPROM, flash memory.

As is known in the art, a computer 700 can have different or other components than those shown in FIG. 7. In addition, the computer 700 can lack certain illustrated components. In one embodiment, a computer 700 acting as a server may lack a keyboard 710, pointing device 714, graphics adapter 712, or display 718. Moreover, the storage device 708 can be local or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 708, loaded into the memory 706, and executed by the processor 702.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A non-transitory computer readable storage medium comprising stored instructions for classifying a point of interest that, when executed, cause a computing system to perform operations comprising:
    receiving an identification of a point of interest from a client device;
    retrieving properties for the point of interest, the properties including a verified property and an unverified property, wherein the properties were generated by a process including:
        obtaining training data sets for classifying points of interest;
        training a machine-learning point of interest classification model, using the training data sets, to generate properties for points of interest; and
        using the machine-learning point of interest classification model to generate the properties;
    generating a properties input interface to be displayed on the client device, wherein the properties input interface comprises displaying a prompt requesting a user to verify the unverified property;
    receiving a verification of the unverified property from the client device, the verification having been provided via the properties input interface in response to the prompt; and
    updating the properties for the point of interest based on receiving the verification of the unverified property.

2. The non-transitory computer readable storage medium of claim 1, wherein the training data sets comprise a plurality of points of interest and a plurality of verified properties for the plurality of points of interest.

3. The non-transitory computer readable storage medium of claim 1, wherein the identification of a point of interest is determined based on a geographic location of the client device.

4. The non-transitory computer readable storage medium of claim 1, wherein the properties for the point of interest comprise at least one verified property and at least one unverified property.

5. The non-transitory computer readable storage medium of claim 1, wherein the properties input interface comprises at least one unverified property.

6. The non-transitory computer readable storage medium of claim 1, wherein the instructions further cause the computing system to input the received selection of properties to the machine-learning point of interest classification model.

7. The non-transitory computer readable storage medium of claim 1, wherein the instructions further cause the computing system to place a virtual object at the point of interest based on the updated properties for the point of interest.

8. A method for classifying a point of interest comprising:
    receiving an identification of a point of interest from a client device;

retrieving properties for the point of interest, the properties including a verified property and an unverified property, wherein the properties were generated by a process including:
  obtaining training data sets for classifying points of interest;
  training a machine-learning point of interest classification model, using the training data sets, to generate properties for points on interest; and
  using the machine-learning point of interest classification model to generate the properties;
generating a properties input interface to be displayed on the client device, wherein the properties input interface comprises displaying a prompt requesting a user to verify the unverified property;
receiving a verification of the unverified property from the client device the verification having been provided via the properties input interface in response to the prompt; and
updating the properties for the point of interest based on receiving the verification of the unverified property.

9. The method of claim 8, wherein the training data sets comprise a plurality of points of interest and a plurality of verified properties for the plurality of points of interest.

10. The method of claim 8, wherein the identification of a point of interest is determined based on a geographic location of the client device.

11. The method of claim 8, wherein the properties for the point of interest comprise at least one verified property and at least one unverified property.

12. The method of claim 8, wherein the properties input interface comprises at least one unverified property.

13. The method of claim 8, further comprising inputting the received selection of properties to the machine-learning point of interest classification model.

14. The method of claim 8, further comprising placing a virtual object at the point of interest based on the updated properties for the point of interest.

15. A system comprising:
memory with instructions encoded thereon; and
one or more processors that, when executing the instructions, are caused to perform operations comprising:
  receiving an identification of a point of interest from a client device;
  retrieving properties for the point of interest, the properties including a verified property and an unverified property, wherein the properties were generated by a process including:
    obtaining training data sets for classifying points of interest;
    training a machine-learning point of interest classification model, using the training data sets, to generate properties for points on interest; and
    using the machine-learning point of interest classification model to generate the properties;
  generating a properties input interface to be displayed on the client device, wherein the properties input interface comprises displaying a prompt requesting a user to verify the unverified property;
  receiving a verification of the unverified property from the client device the verification having been provided via the properties input interface in response to the prompt; and
  updating the properties for the point of interest based on receiving the verification of the unverified property.

16. The system of claim 15, wherein the training data sets comprise a plurality of points of interest and a plurality of verified properties for the plurality of points of interest.

17. The system of claim 15, wherein the identification of a point of interest is determined based on a geographic location of the client device.

18. The system of claim 15, wherein the properties for the point of interest comprise at least one verified property and at least one unverified property.

19. The system of claim 15, wherein the properties input interface comprises at least one unverified property.

20. The system of claim 15, further comprising inputting the received selection of properties to the machine-learning point of interest classification model.

* * * * *